Patented Dec. 26, 1950

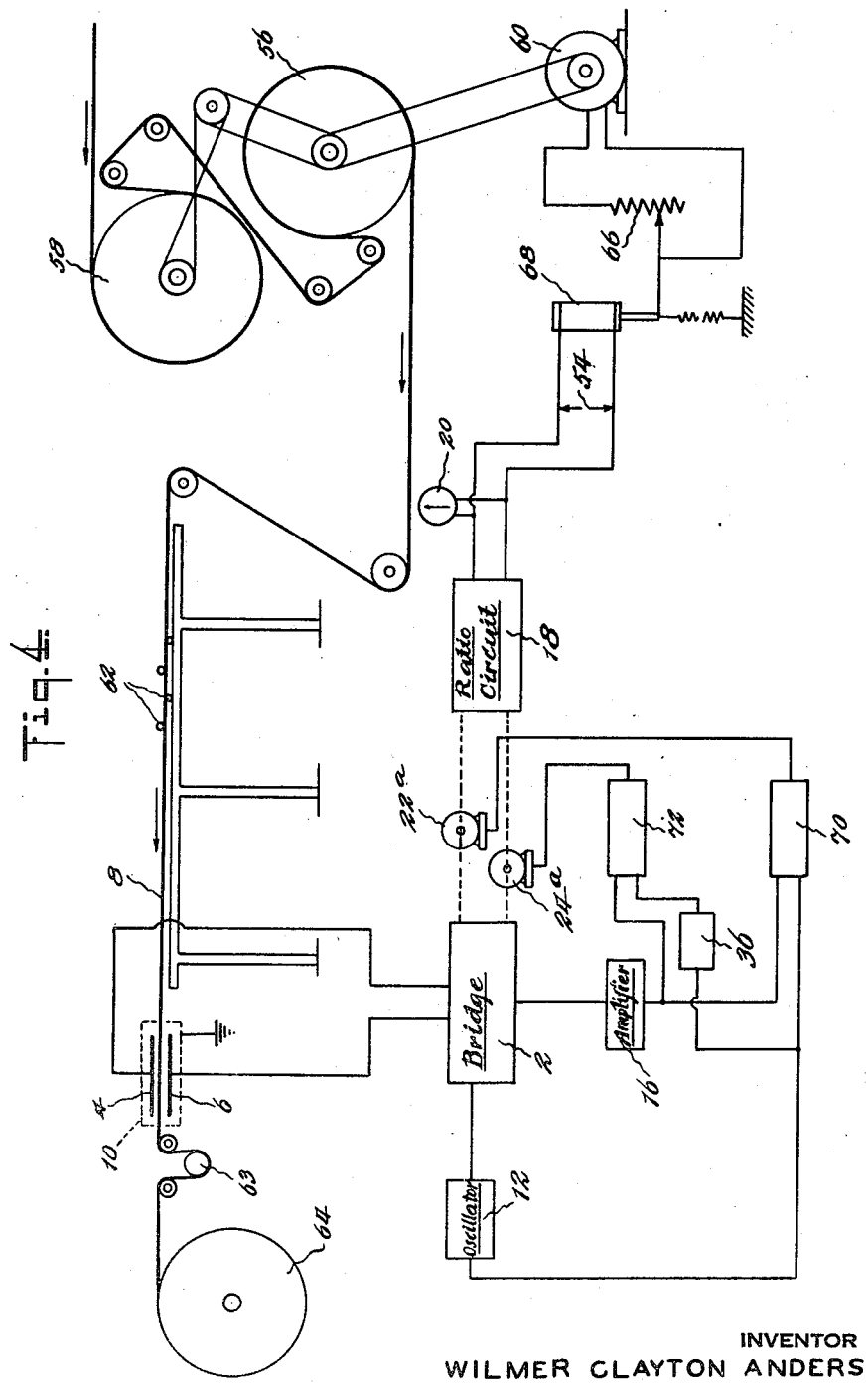

2,535,027

UNITED STATES PATENT OFFICE 2,535,027

APPARATUS FOR MEASURING AND CONTROLLING MOISTURE CONTENT OR THE LIKE

Wilmer Clayton Anderson, Greenwich, Conn., assignor to Deering Milliken Research Trust, New York, N. Y., a trust of New York Application March 27, 1947, Serial No. 737,464

15 Claims. (Cl. 34—52)

The present invention relates to measuring and controlling devices and comprises novel apparatus particularly adapted for measuring the per cent moisture content or regain of material. The invention includes also apparatus for automatically and continuously controlling the moisture content or regain of materials during production. The invention may be advantageously employed in the textile industry, for example, for measuring and controlling, where desired, the per cent moisture regain of yarns, or in the paper industry, for measuring and controlling the moisture content of paper during production. The invention can be employed for measurement and control of moisture content of granular material as well as of material in sheet or other continuous form.

In a copending application Ser. No. 730,154, filed February 21, 1947, there is described and claimed a method of moisture determination which is independent, within limits, of dimensions and weight of the material the moisture content of which is to be measured. The apparatus of the present invention employs the principle of the said copending application and comprises both manually and automatically operated means for determining and controlling moisture content. As described in said application, when material is inserted between the electrodes of a condenser, the ratio of the change in equivalent series resistance of the condenser, $\Delta R_s$, to the change in capacity, $\Delta C$, is a measure of the moisture content of the material. The relationship between this ratio and the moisture content is substantially independent of the dimensions or weight of the material through a relatively wide range of per cent moisture content provided the thickness of the material is relatively small as compared to the distance between the condenser electrodes. The present invention provides means for measuring this ratio and recording it, if desired, as well as means for maintaining such ratio at any desired value corresponding to a specific value of moisture content or regain.

For an understanding of the invention reference may be had to the accompanying drawings of which:

Fig. 4 is a diagram showing the apparatus of Fig. 3 arranged for control of per cent moisture regain of textile material, specifically, the per cent moisture regain of the warp thread upon emersion from the slasher.

Figure 1:
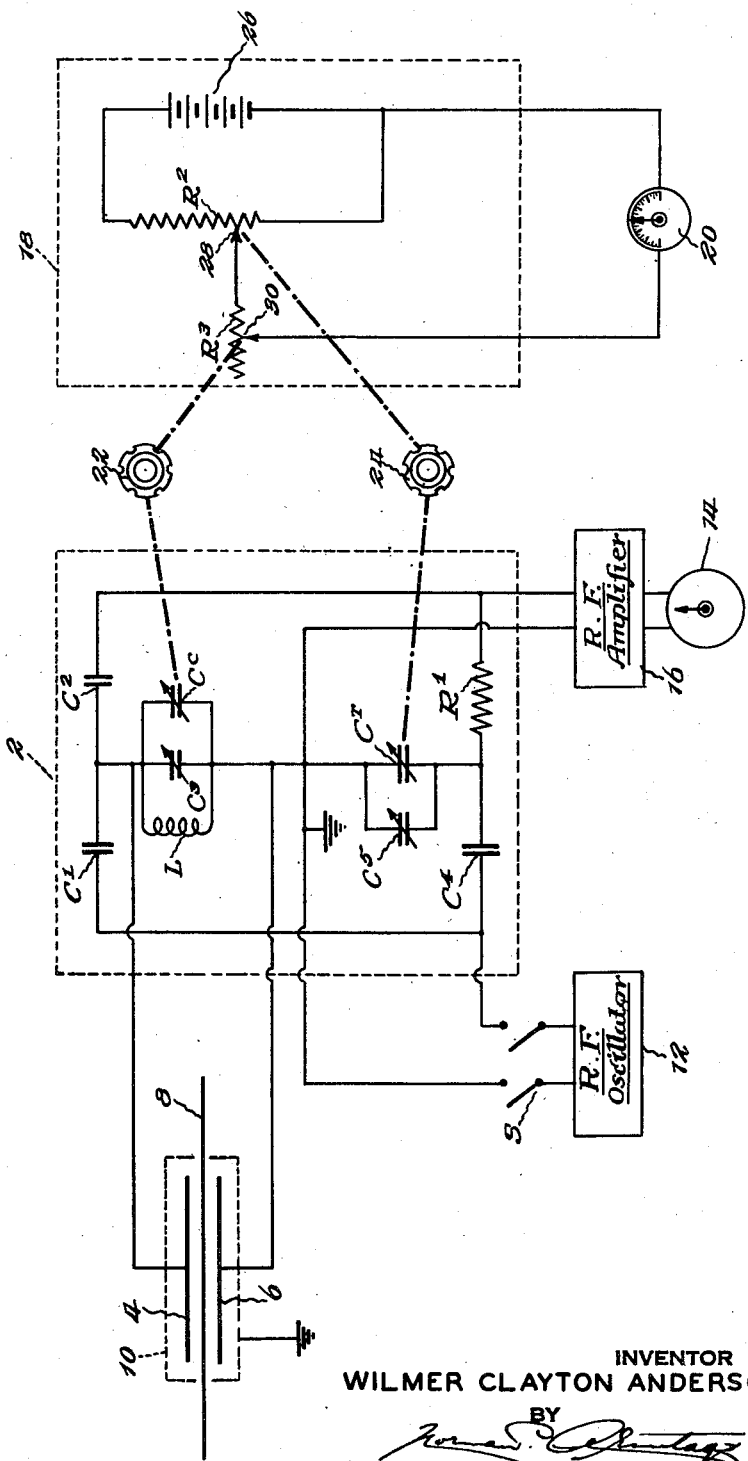
Fig. 1 is a diagram of a manually operated moisture meter embodying the invention.

In the embodiment of the invention illustrated in Fig. 1, the circuit elements of a twin-T bridge are shown within the dashed enclosure 2. As shown in Fig. 1, one T of the bridge has condensers $C_1$ and $C_2$ in the arms thereof and parallel connected inductor L and variable capacities $C_c$ and $C_3$ in the leg thereof. The other T of the bridge has the condenser $C_4$ in one arm, the resistance $R_1$ in the other and parallel connected variable capacities $C_5$ and $C_r$ in the leg. The junction of the legs of the two T's is grounded and, when a source of alternating current is applied across the ground connection and the lead connecting $C_1$ and $C_4$ and the bridge is in balance, no current will flow through an indicator connected to ground and to the lead connecting $C_2$ and $R_1$. If an unknown impedance is connected across the capacities $C_c$ and $C_3$ after the bridge has been balanced, the bridge may be restored to balance by adjustment of the capacities $C_c$ and $C_r$, the required adjustment of $C_c$ to restore balance being a measure of the reactive component of the unknown impedance and the required adjustment of $C_r$ being a measure of the resistive component of the unknown impedance. Thus, this type of circuit permits measurement of reactive and resistive components in terms of capacity adjustments. For a more complete explanation of twin-T bridge networks of this type, see Proc. Inst. of Radio Engineers, vol. 28, pages 310–315.

In accordance with the invention, a pair of spaced plates, 4 and 6, of a condenser, for reception therebetween of the material 8 to be tested, are connected across the variable capacity $C_c$ of the bridge 2. The plates 4 and 6 are preferably provided with a grounded shield 10, as indicated. Alternating current of radio frequency is supplied to the input terminals of the bridge network from a source 12 and a null or balance indicator 14 is connected to the output terminals through an amplifier 16.

A ratio computing circuit, shown within the dashed enclosure 18, is mechanically coupled to the bridge in any suitable manner so as to have its elements adjusted conjointly with the adjustment of capacities $C_c$ and $C_r$ during restoration of the bridge to balance. A meter 20 is connected to the ratio circuit and may have its scale calibrated in percentage moisture content or regain.

Dials 22 and 24 in Fig. 1 represent manually operable members for adjustment of $C_c$ and $C_r$, respectively. The particular ratio computing circuit indicated in the drawing comprises a battery 26 connected across a resistor $R_2$ and a resistor $R_3$ having one end connected to a movable tap 28 on resistor $R_2$. The meter 20 is connected to one end of resistor $R_2$ and to movable tap 30 on resistor $R_3$. With this arrangement, if the portion of resistor $R_3$ in series with the meter 20 is large compared to the resistance of that part of resistor $R_2$ bridged by the meter circuit, then the current through the meter is proportional to the ratio of this bridged portion of resistor $R_2$ to the resistance of the portion of resistor $R_3$ in series with the meter 20. Thus, by mechanically coupling the tap 28 to the movable element of capacity $C_r$ for conjoint manual control by dial 24, and similarly coupling tap 30 to the movable element of condenser $C_c$ for conjoint manual control by dial 22, the meter 20 will respond proportionately to the ratio, $\Delta R_s/\Delta C$, and its scale can be calibrated to read directly in percent moisture content or regain of the type of material 8 under examination.

In operation of the meter of Fig. 1, the oscillator 12 is first connected to the input terminals of the bridge, as by closure of the switch S, and the capacities $C_3$ and $C_5$ adjusted to balance the bridge and give zero indication in meter 14 when no material is between the plates 4 and 6. The material 8 is then inserted between the plates 4 and 6 and the dials 22 and 24 manually adjusted until the meter 14 indicates a return of the bridge to balance. The per cent moisture content (or regain, depending on the calibration of the scale) of the material 8 may then be read directly from the meter 20.

If a length of the material 8 is moved through the test condenser, changes in moisture content and also changes in weight or dimensions of the material will unbalance the bridge. Upon readjustment of dials 22 and 24 to restore balance, the meter reading 20 will indicate the moisture content of the new length of the material; the meter reading being unchanged if the moisture content has not changed.

When the apparatus of Fig. 1 is used to measure the moisture content of material of a different composition than that of material 8, for example, wool instead of cotton, it is only necessary to change the scale of meter 20 correspondingly; it being assumed that suitable scales for the different compositions of material have been prepared giving the relationship of $\Delta R_s/\Delta C$ to per cent moisture content for each composition.

Figure 2:
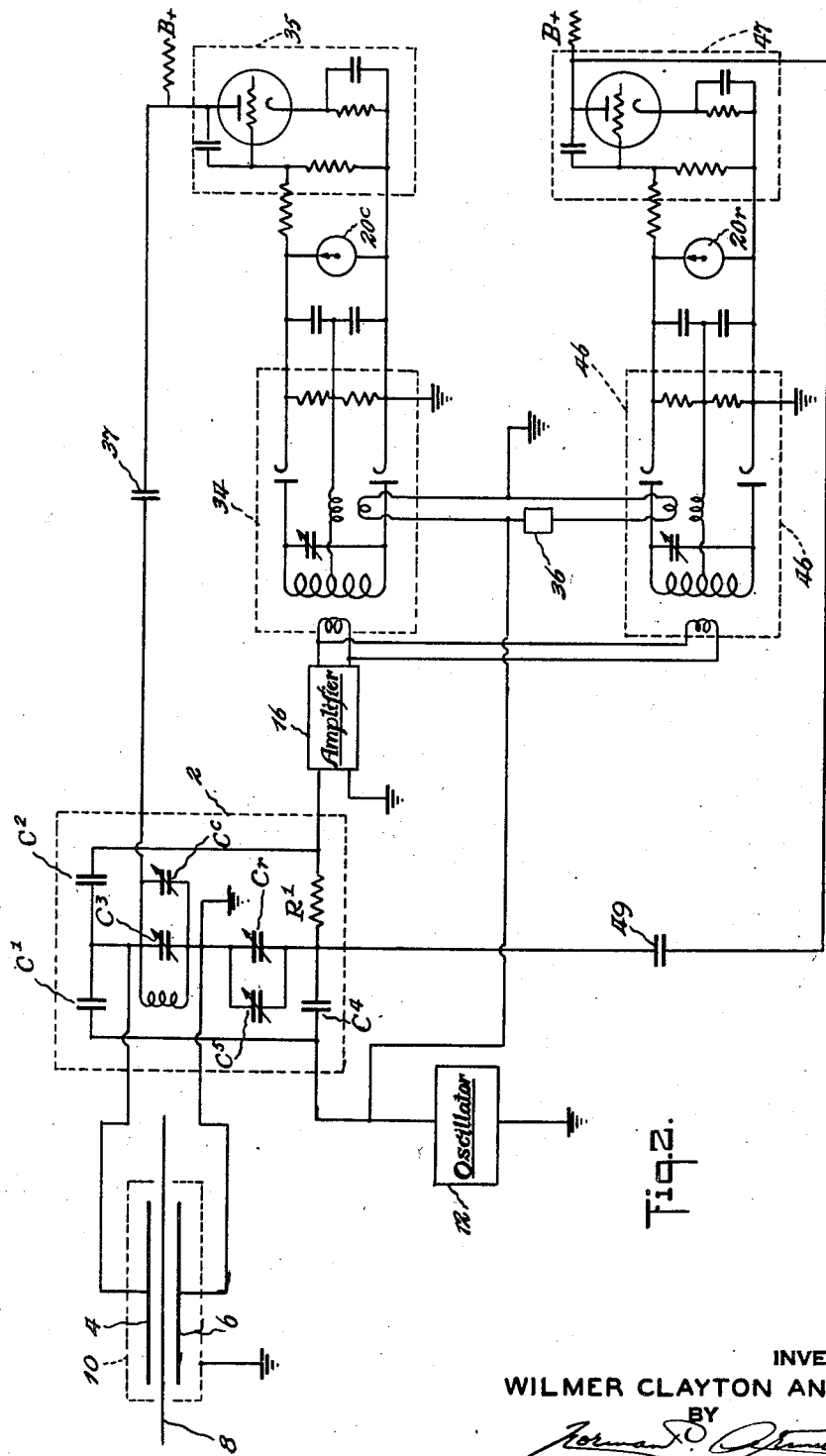
Fig. 2 is a diagram of an automatic moisture meter embodying the invention.

In Fig. 2 is diagrammatically shown a moisture meter in which the bridge balance is automatically restored electronically. In this embodiment of the invention the output of the amplifier 16 is connected in parallel to a pair of phase discriminators, the circuits of which are shown within the dashed enclosures 34 and 46. Discriminators 34 and 46 are supplied with current from oscillator 12, a suitable phase shifting device 36 being inserted between the source and discriminator 46. A voltmeter 20c is connected across the output of the discriminator circuit 34 and a voltmeter 20r is connected across the output of the discriminator circuit 46. Output from discriminator 34 occasioned by capacitative unbalance of the bridge 2 is impressed across a reactance tube 35 the plate circuit of which is coupled through a condenser 37 to the ungrounded side of capacity $C_c$. Similarly, the output from discriminator 46, occasioned by resistive unbalance of the bridge is impressed across a reactance tube 47, the plate circuit of which is coupled through a condenser 49 to the ungrounded side of capacity $C_r$. With this arrangement, the reactance tubes 35 and 47 automatically operate, in response to unbalance of the bridge, to vary the capacity of the legs of the T's in a direction to restore the bridge to balance.

In operation of the meter of Fig. 2, the bridge is first brought to balance, without the test material between the plates 4 and 6, by suitable adjustment of condensers $C_c$ and $C_r$. Balance is indicated by zero readings of voltmeters 20c and 20r. The test material 8 is then inserted between the plates 4 and 6 and when the meter needles reach a steady value, the ratio of their readings is taken and the moisture content determined therefrom by reference to previously prepared charts or tables. Material 8 may be continuously fed through the meter and moisture measurement determined at any time from the ratio of the readings of voltmeters 20r and 20c.

Figure 3:
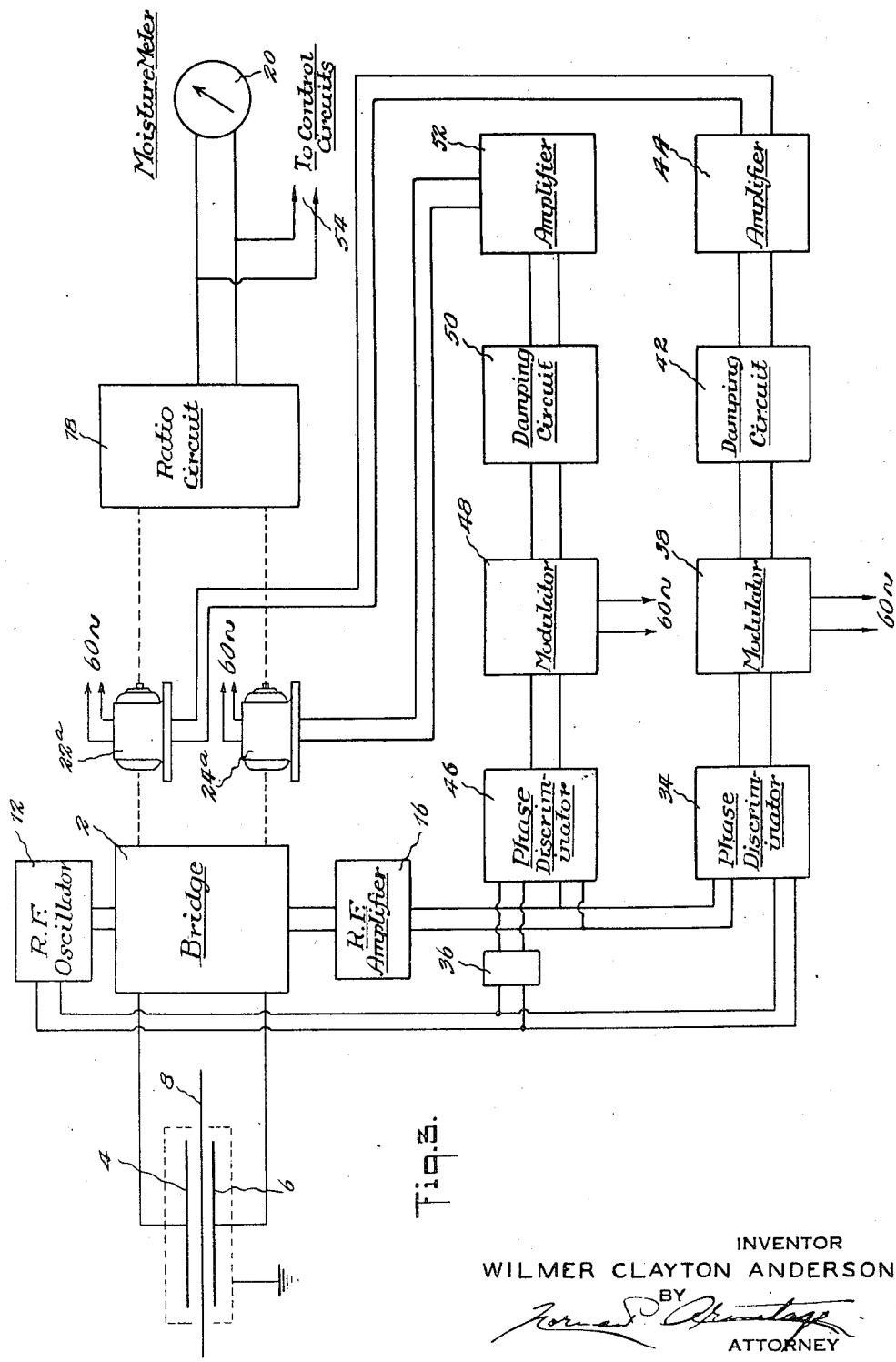
Fig. 3 is a block diagram of an automatic moisture meter and control device representing another embodiment of the invention.

A fully automatic moisture meter and control device embodying the invention is diagrammatically indicated in Fig. 3. As in the meter of Figs. 1 and 2, the meter of Fig. 3 includes a twin-T bridge 2 fed with radio frequency current by the oscillator 12 connected to the bridge input terminals, and the radio frequency amplifier 16 connected across the bridge output terminals. The circuit of the bridge 2 is not shown in Fig. 3. It will be understood that the plates 4 and 6 are connected, as in Figs. 1 and 2 across the variable capacity the adjustment of which to restore balance of the bridge is a measure of the change in capacity occasioned by insertion of the material 8 between the plates 4 and 6. Motors 22a and 24a are provided for adjustment of the bridge balancing elements and of the elements of the ratio circuit 18; these motors being energized upon unbalance of the bridge network and operating to restore the bridge to balance. Motor 22a is energized upon unbalance of the bridge due to change in capacity of the test cell, and motor 24a is energized when the unbalance is due to change in equivalent series resistance of the cell. The energizing circuit for motor 22a includes the phase discriminator 34, having one pair of input terminals connected to the radio frequency amplifier 16, and the other pair of input terminals connected to the radio frequency oscillator 12. Output from discriminator 34, occurring when the bridge is capacitatively unbalanced, is fed to a balanced modulator 38 where it is modulated by a 60 cycle current supplied to the modulator from any suitable source. The 60-cycle modulated output from the modulator 38 is damped by passage through a suitable damping circuit 42, and after amplification in an amplifier 44 is delivered to the motor 22a. The energizing circuit of motor 24a is similar to that just described for motor 22a, and comprises the discriminator 46, connected to the radio frequency amplifier 16 and to oscillator 12 through the 90 degree phase shifting device 36, the balanced modulator 48, damping circuit 50 and 60-cycle amplifier 52. The carrier frequency current from oscillator 12 is delivered to discriminator 34 without phase shift in order to cause operation of motor 22a in response to unbalance of the bridge network occasioned by change in capacitance of the test cell.

The specific circuit elements of the phase discriminators 34 and 46 are not indicated in Fig. 3 as they may be similar to those shown in Fig. 2. It will be understood that the arrangement is such that when the bridge is in balance and consequently no current is delivered to the discriminators 34 and 46 by the radio frequency amplifier 16, there will be no output from either discriminator; whereas when the bridge is unbalanced, the output from discriminator 34 will vary in magnitude and in phase with the extent and direction of capacitative unbalance of the bridge, and the output of discriminator 46 will vary in magnitude and phase with the extent and direction of resistive unbalance of the bridge. Thus, the motors 22a and 24a, with their control circuits, comprise means for automatic restoration of the bridge to balanced conditions and for corresponding adjustment of the elements of the ratio circuit 18 to give direct reading of moisture content by the meter 20.

Instead of delivering the radio frequency carrier current directly to the phase discriminators and modulating the output of the discriminators with 60-cycle current, the carrier current could be suppressed by modulation of the output from the oscillator 12 with 60-cycle current before delivery to the phase discriminators.

The automatic meter of Fig. 3 can be used as a regulator by connecting the output terminals 54 of the ratio circuit 18 to a suitable element affecting the moisture content of the material 8. In Fig. 4, use of the automatic meter of Fig. 3 for control of moisture content of the warp threads delivered from a slasher is diagrammatically illustrated. In Fig. 4, two drying cylinders 56 and 58 of a conventional slasher are shown driven by a motor 60. The warp 8 issuing from the slasher passes between the split rods 62, around the measuring roll 63 and is wound on the loom beam 64. To control the per cent moisture regain of the warp, the warp in its travel to the measuring roll is passed between the plates 4 and 6 of the test cell of the meter and the speed of motor 60 varied in response to changes in moisture regain as automatically measured by the meter. In the particular embodiment of the invention diagrammatically indicated in Fig. 4, the control of motor 60 is effected by adjustment of a resistance 66 in the motor circuit, and this resistance is controlled by a solenoid 68 connected to the output circuit 54 of the ratio circuit 18. The operation of the equipment of Fig. 4 will be clear from the description already given of the automatic meter of Fig. 3 and of the manually operated meter of Fig. 1. In Fig. 4, the controlling circuit for motor 22a is indicated diagrammatically by the single unit 70 and that for motor 24a by the unit 72.

The invention has now been described with reference to three embodiments thereof, and a specific application of the invention to the control of moisture content or regain of yarn has been indicated. Obviously, various changes in the metering and control circuits could be made without departure from the invention as defined in the appended claims, and various elements effecting moisture content of material could be regulated by this automatic meter.

Various scales of meter 20, corresponding to various compositions of material to be tested by the equipment of either Fig. 1 or Fig. 3 may be readily calibrated in accordance with the method disclosed in the said copending application. Such method involves only the taking of a set of measurements with material of known different moisture content, and the correlation of the indications of meter 20 when the bridge is balanced with the respective moisture content. Similarly, charts or graphs can be prepared which give the relation between moisture content and ratio of $$\frac{\Delta R_s}{\Delta C}$$

for any particular material for use with the meter of Fig. 2.

In the foregoing description of Figs. 1, 3 and 4, the computing circuit 18 has been designated as a ratio circuit. This is because the ratio of $\Delta R_s/\Delta C$ is a measure of moisture content, and the meter of the present invention is particularly adapted for the measurement of moisture. Obviously, however, certain features of the invention such as the means for automatically restoring a twin-T bridge network to balance and conjoint control of bridge elements and of elements of a computing circuit for an indicator could be advantageously employed in meters designed for measurement of other variables.

What is claimed:

1. A meter comprising in combination a balancing network including at least two adjustable elements, a condenser for reception of material to be tested between the electrodes thereof connected across one of said elements, a source of alternating potential for said network, a device so connected to the network as to be energized only when said network is out of balance, means for adjusting said elements to restore balance of said network upon unbalance thereof, a computing network having a pair of adjustable elements operatively connected with said last mentioned means so as to be adjusted simultaneously with the first pair of elements, and an indicating device connected to said computing network for indicating the condition thereof.

2. A moisture meter comprising in combination a balancing network including a pair of adjustable elements, a condenser connected across one of said elements and adapted for reception of material to be tested between the electrodes thereof, a radio frequency oscillator connected to said network, a device so connected to said network as to be energized when said network is out of balance, means for adjusting the element bridging said condenser to compensate for changes in capacity of said condenser, means for adjusting said other element to compensate for changes in equivalent series resistance of said condenser, a ratio circuit, an adjustable element in said ratio circuit operatively connected with said first mentioned means for control thereby conjointly with the first mentioned adjustable element of the network, a second adjustable element in said ratio circuit operatively connected with said second means for control thereby conjointly with the last mentioned adjustable element of the network, and an indicator for said ratio circuit.

3. The combination according to claim 2 including circuit elements connected to said device for automatically operating said control means upon energization of said device.

4. A meter for determining the moisture content of material which comprises a pair of electrodes forming a condenser and adapted for reception of the test material therebetween, a network connected to said electrodes and responsive to the capacity and equivalent series resistance of the condenser, and means operatively connected with said network for indicating the ratio of the change in equivalent series resistance to change in capacity in the condenser occasioned by the insertion of material between said electrodes.

5. The meter according to claim 4 wherein said network is a twin-T bridge having an adjustable capacity in the leg of each T, said electrodes being connected across one of said adjustable capacities, and wherein said last mentioned means comprises a ratio circuit having an adjustable element coupled for conjoint control with the capacity bridged by said electrodes, and another adjustable element coupled for conjoint control with the other adjustable capacity of the bridge.

6. An automatic moisture meter for determining the moisture content of material which comprises a twin-T bridge network having an adjustable capacity in the leg of each T, an inductor bridging one of said capacities, an air condenser connected across said last mentioned capacity and adapted to receive test material between the electrodes thereof, a source of radio frequency current connected across the input terminals of the bridge, an amplifier connected to the output terminals of the bridge, a ratio circuit having a pair of adjustable elements, a motor for conjointly adjusting one of said elements and one of said adjustable capacities of the bridge, a second motor for conjointly adjusting the other of said elements and the other of said adjustable capacities of the bridge, electrical means interposed between said amplifier and said motors for energizing said motors in a direction to restore balance of the bridge upon unbalance thereof, and an indicator connected to said ratio circuit for indicating the ratio of such adjustments.

7. The automatic moisture meter according to claim 6 wherein said electrical means include a pair of phase discriminators, each connected with said amplifier and said source, output from one of said discriminators effecting operation of one of said motors and output from the other discriminator effecting operation of the other motor, and means for shifting the phase of one of the currents supplied to that discriminator effecting control of the motor adjusting the capacity not bridged by the condenser.

8. In an automatic moisture control device of the type having a pair of electrodes forming a condenser for reception therebetween of material the moisture content of which is to be controlled and having current responsive means for varying the moisture content of the material, the improvement which comprises a network connected to said electrodes and responsive to the capacity and equivalent series resistance of the condenser, means operatively connected with said network for creating a control current proportional to the ratio of the change in equivalent series resistance to the change in capacity of the condenser occasioned by insertion of the material between the electrodes and means delivering said control current to the current responsive means.

9. A moisture regulator of the type having a pair of electrodes forming a condenser for passage therebetween of the warp delivered by a slasher, the rotating speeds of the cylinders of which may be varied, the improvement which comprises a balancing network having adjustable elements and connected to said electrodes, means responsive to an unbalance of said network occasioned by the presence of the warp between the electrodes for adjusting said element to restore said network to balance and for creating a control current varying with the ratio of the change of equivalent series resistance to the change in capacity across the electrodes due to the presence of the warp between the electrodes, and means for varying the rotating speed of the slasher cylinders in accordance with variation of said current from a predetermined value.

10. In a meter for indicating changes in equivalent series resistance and capacity of a condenser, a balancing network including two balancing branches each including capacitative elements, means connecting said condenser in parallel with one of said branches, a source of high frequency energy for said network, a device adapted to be energized in response to output energy of said network in phase with said source indicative of a change in the equivalent series resistance of said condenser, a second device adapted to be energized in response to output energy of said network out of phase with said source indicative of a change of capacity of said condenser, and means controlled by said devices and responsive to energization thereof for changing the effective capacities of said branches to restore said network to balance upon change in capacity or equivalent series resistance of said condenser.

11. A meter for indicating changes in equivalent series resistance and capacity of an element which comprises a twin-T bridge network having a parallel connected inductor and adjustable capacity in the leg of one T and an adjustable capacity in the leg of the other T, said element being connected across said first mentioned adjustable capacity, a source of alternating current for said network, a phase discriminator connected to said source and to said bridge for delivering current varying in direction and magnitude with departures of the bridge from balance due to a change in equivalent series resistance of the element, means energized in response to current delivered by said discriminator for adjusting the second mentioned variable capacity of the bridge in a direction to restore the bridge to balance, a second phase discriminator connected to said bridge and to said source for delivering current varying in direction and magnitude with departures of the bridge from balance due to changes in capacity of said element, means for changing the phase of one of the currents supplied to said first mentioned discriminator, means energized in response to current delivery by said last mentioned discriminator for adjusting the capacity bridged by said element in a direction to restore the bridge to balance and means indicating the extent of energization of said adjusting means.

12. The meter according to claim 11 wherein said indicating means includes a ratio circuit having a pair of adjustable circuit elements, one of said circuit elements being coupled with the means for adjusting one of said variable capacities so as to be conjointly controlled therewith and the other of said circuit elements of the ratio circuit being coupled with the means for adjusting the other variable capacity so as to be conjointly controlled therewith whereby current in said circuit varies with the ratio of the change in equivalent series resistance to the change in capacity of the element connected across one variable capacity of the bridge.

13. In a meter for indicating changes in equivalent series resistance and capacity of a condenser, the combination comprising a twin-T bridge network having capacitative elements in the legs thereof, said condenser bridging the leg elements of one T, a source of alternating current for said network, a phase discriminator connected to said source and to said bridge for delivering current varying in direction and magnitude with departure of the bridge from balance due to change in equivalent series resistance of the condenser, means responsive to current delivered by said discriminator for adjusting the capacity of the leg of the other T network in a direction to restore the bridge to balance, a second phase discriminator connected to said bridge and to said source for delivering current varying in direction and magnitude with departure of the bridge from balance due to change in capacity of said condenser, means for changing the phase of one of the currents supplied to said first mentioned discriminator and means responsive to current delivered by said last mentioned discriminator for adjusting the capacity of the leg of the T bridged by said condenser.

14. The combination according to claim 13 wherein said means responsive to the currents delivered by said discriminators are reactance tubes having their outputs capacitatively coupled to the legs of the T networks and wherein means are provided for indicating the outputs of said discriminators.

15. The combination according to claim 13 wherein said means responsive to the currents delivered by said discriminators are motors and wherein means are provided for indicating the extent of energization thereof for restoration of the bridge network to balance.

WILMER CLAYTON ANDERSON.

REFERENCES CITED

The following references are of record in the file of this patent:

UNITED STATES PATENTS

| Number | Name | Date |
|---|---|---|
| 2,110,523 | Geyer | Mar. 8, 1938 |
| 2,138,344 | Geyer | Nov. 29, 1938 |
| 2,149,256 | Geyer | Mar. 7, 1939 |
| 2,244,722 | Norcross | June 10, 1941 |
| 2,251,641 | Stein | Aug. 5, 1941 |
| 2,311,673 | Lilja | Feb. 23, 1943 |
| 2,346,437 | Krogh | Apr. 11, 1944 |
| 2,373,846 | Olken | Apr. 17, 1945 |

OTHER REFERENCES

Proceedings of the I. R. E.; July 1940; pages 310–318.